United States Patent [19]

Waitman et al.

[11] 3,972,026

[45] July 27, 1976

[54] LINKED LIST ENCODING METHOD AND CONTROL APPARATUS FOR REFRESHING A CATHODE RAY TUBE DISPLAY

[75] Inventors: Thomas Frank Waitman, Mountain View; Richard Ricker Lyman, Palo Alto, both of Calif.

[73] Assignee: Hewlett-Packard Company, Palo Alto, Calif.

[22] Filed: Sept. 23, 1974

[21] Appl. No.: 508,600

[52] U.S. Cl. .......... 340/172.5

[51] Int. Cl.[2] .......... G06F 3/14

[58] Field of Search ....... 340/172.5, 324 A, 324 AD

[56] References Cited

UNITED STATES PATENTS

| | | | |
|---|---|---|---|
| 3,500,470 | 3/1970 | Barker et al. | 340/324 AD |
| 3,623,068 | 11/1971 | Horgan et al. | 340/324 A |

*Primary Examiner*—Raulfe B. Zache

*Attorney, Agent, or Firm*—Theodore Scott Park

[57] ABSTRACT

Data is configured in 8 bit control characters and 8 bit data characters and stored in a terminal random access memory as a linked list structure. Control apparatus accesses the data stored in the terminal memory in 16 character blocks and identifies the accessed information as representing figures to be displayed, video enhancement features, or program execution path changes. Each two character link provides an address pointer to the next 16 character block of data and control information. The first character block of a line of displayable figures has links to the previous displayable line and the next line of characters to be displayed.

The control apparatus combines internal hardware functions and the linked list encoding structure as implemented by program logic to provide display and control character identification, data access address modification, video display enhancement and selection of alternate character sets.

24 Claims, 13 Drawing Figures

BUS CYCLE FLIP FLOPS

| 32 | 34 | 36 | MEANING | BUSY | REQUEST | PRIORITY OUT | INPUT TO STATE |
|---|---|---|---|---|---|---|---|
| 0 | 0 | 0 | IDLE | 0 | 0 | PRIORITY IN | STATE 001 |
| 1 | 0 | 0 | REQUEST BUS | 0 | 0 | 0 | $\overline{80}$ DMA ON |
| 1 | 1 | 0 | GET BUS | 1 | 0 | 0 | STATE 100 $\overline{\text{BUSY}}$ . PRIORITY IN |
| 1 | 1 | 1 | REQUEST | 1 | 1 | 0 | STATE 110 |
| 0 | 1 | 1 | DECODE INPUT BYTE | 1 | 1 | PRIORITY IN | $\overline{\text{WAIT}}$ . STATE 111 |
| 0 | 0 | 1 | RELEASE BUS | 0 | 0 | PRIORITY IN | STATE 011 |

FIGURE 7

CHARACTER ENCODING

| | BIT 7 | 6 | 5 | 4 | 3 | 2 | 1 | ∅ | FUNCTION |
|---|---|---|---|---|---|---|---|---|---|
| DISPLAY CHARACTER | 0 | X | X | X | X | X | X | X | DATA (128 BITS) |
| CONTROL ENCODING CHARACTERS | 1 | 0 | X | X | X | X | X | X | CONTROL (64 BITS) |
| | 1 | 1 | 1 | X | X | X | X | X | LINK |
| | 1 | 1 | 0 | 1 | X | X | X | X | LINK |
| | 1 | 1 | 0 | 0 | 0 | X | X | X | FLAGS |
| | 1 | 1 | 0 | 0 | 1 | 1 | 0 | 0 | END OF LINE |
| | 1 | 1 | 0 | 0 | 1 | 1 | 1 | 0 | END OF PAGE |

| FUNCTION | EXPLANATION |
|---|---|
| DATA | 128 ASCII FIGURES |
| CONTROL | 2 CHARACTER SETS, HALF BRIGHT, UNDER LINE, INVERSE VIDEO, BLINK, ETC. |
| LINK | MOST SIGNIFICANT BYTE, LEAST SIGNIFICANT BYTE OF LOCATION OF NEXT CHARACTER |
| FLAGS | USED FOR PROTECTING FIELDS |
| END OF LINE | BLANK TO END OF LINE |
| END OF PAGE | BLANK TO END OF PAGE |

FIGURE 8

LINKED LIST ENCODING METHOD AND CONTROL APPARATUS FOR REFRESHING A CATHODE RAY TUBE DISPLAY

BACKGROUND AND SUMMARY OF THE INVENTION

The display in a cathode ray tube terminal can have a number of hardware and software specialized functions which describe the displayed image besides the normal characters. For example, the characters can be blinking, half-bright, inverse video, underlined or protected so they may not be altered. In addition, the display structure itself may be alterable. All three of these types of information, hardware display parameters, soft-ware parameters, and display structures are examples of information which must be embedded in the display text without causing blanks to be inserted in the display.

A typical solution is to use a wide display character which has appended onto it one bit for each function. Each additional bit represents a different control function. Referring to FIG. 1 there is shown a typical method wherein parallel definition of display parameters is utilized. Such a method would require for example, if ASCII were the coding utilized, the width of the characters to be 7 bits. One bit in addition, would be required for each enhancement mode. Six enhancement modes would require an additional 6 bits for each character displayed. If one were to add a protected field feature the total required width necessary would be 14 bits per character. This would require a display memory having a capacity greater than or equal to 14 bits per character. If a particular enhancement feature, for example, underlining, is desired, the enhancement bit would be on for characters displayed with underlining and off for non-underlining. Therefore, whether an enhancement feature is used or not the extra bits of display storage are required.

Referring to FIG. *2a* there is shown a second method having advantages over the first. In this second technique every character is made 8 bits wide. The characters are of two types: 8 bit data characters and 8 bit control characters. Data characters are directly displayable whereas control characters indicate a change in mode of enhancements or other control function.

Referring to FIG. *2b*, assume it is desired to display the word FIELD and to underline each character of the word. The traditional technique discussed above would add a bit to each of the displayed data characters indicating that character is to be underlined. In contrast the second method would precede the displayable word in the character stream with a control character to "start underlining". This control character would then be followed by the 5 display characters. After the final data character to be displayed another control character indicating "stop underline" would be sent. It can be seen the second method requires data storage in the terminal memory only when enhancements are actually used. The second method has the advantages over the first in that the control characters are needed only if the current control state is to be changed. No unnecessary memory is required. Further, the number of control functions is not limited.

DESCRIPTION OF THE DRAWINGS

FIG. 7 illustrates the coding sequence of the bus cycle flip-flops of the preferred embodiment.

FIG. 8 illustrates a method of encoding data for use with the preferred embodiment.

DESCRIPTION OF THE PREFERRED EMBODIMENT

Figure 3:
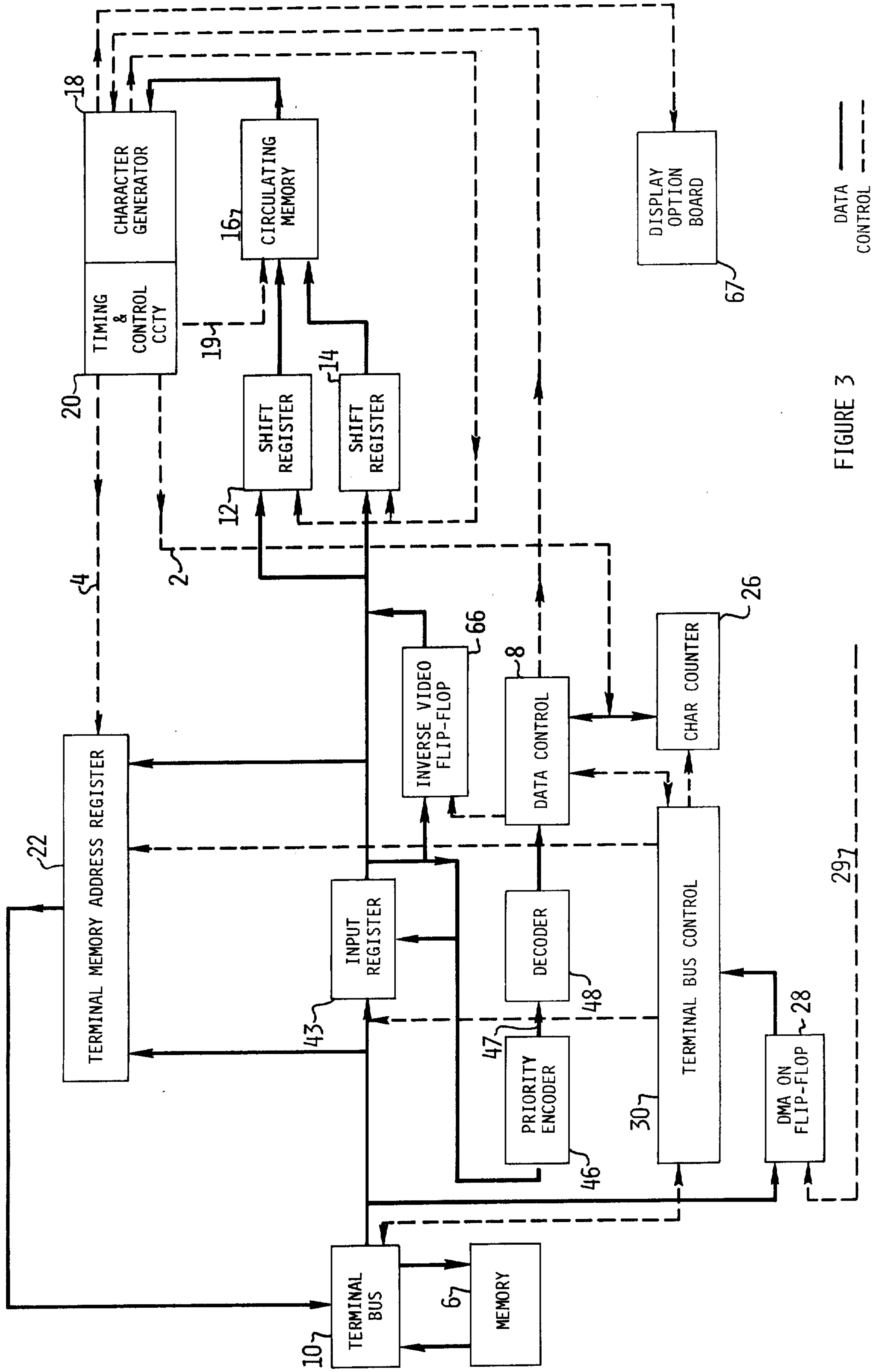
FIG. 3 is a block diagram of a preferred embodiment made in accordance with the invention.

Referring to FIG. 3 there is shown a display refresh control apparatus which reads characters from a random access memory 6, accesses data via input register 43, buffers them in 80 characters shift registers 12 and 14 and sends them to circulating memory 16 and then to character generator 18. The system responds to interrupt set signals 2 and vertical sync signals 4 from Timing and Control Circuitry 20 within character generator 18. Interrupt set signal 2 indicates that a new line of figures to be displayed is to be fetched from the terminal memory 6. Vertical sync signal 4 indicates a beginning of a cathode ray tube screen scan. Interrupt set signal 2 triggers this system to access 80 displayable characters from memory 6 via a terminal bus 10. The data is placed into one of two 80 character shift registers 12 and 14. The buffer which is not being loaded by the system is being rotated at a 2.34 MHz rate and supplies one character for every 9 dot positions being scanned across the face of a display tube. From the system a character may go for example through the character generator 18 to a parallel to serial converter and finally to a cathode ray tube monitor or the like. If the character position is, for example, 15 scan lines high, the 80 character buffers are rotated 15 times before a switch to a new displayable line is signaled by the toggling of an even/odd line 19 from the timing and control circuitry 20.

This cycle repeats with the two 80 character buffers 12 and 14 ping-ponging, first one refreshing while the other buffer loads from the terminal memory 6 and then their roles reverse.

Data is stored in the terminal random access memory 6 in descending memory address order. The first character fetched is for example at an octal address 37777, shown $37777_8$ in FIG. 4, in which is the highest or most significant memory address in the terminal. The next character is $37776_8$, etc.

Referring to FIG. 3, at the beginning of a display of a page, the terminal memory address register 22 is set to location $37777_8$. A data control 8 accesses data characters, decrementing address register 22 after each character and executing the following display and control functions: LINK, wherein two characters are fetched from the terminal memory and become a next location address from which data is to be read. END OF LINE, wherein the remainder of a line to be displayed is written with blanks. END OF PAGE wherein the remainder of a page to be displayed is written with blanks. FLAG, which is used for protecting data fields. DISPLAY ENHANCEMENT, wherein the control system uses one of the dislay enhancements bits, an INVERSE VIDEO bit, and passes it on to the Timing and Control Circuitry 20 along with characters to be displayed. CHARACTER wherein a 7 bit code, for example ASCII or the like, represents 1 of 128 characters to the character generator means 18. Eighty displayable characters per line are accessed after which data control 8 turns off and waits a signal from Timing and Control Circuitry 20 to start a new line. After 24 lines have been fetched from the terminal memory 6, the cycle repeats with the terminal memory address register 22 being set again to $37777_8$.

Referring to FIG. 8, there is shown a novel encoded instruction scheme for use with the embodiment of FIG. 3. Assume the cathode ray tube is scanned one whole frame every 1/60th second. During this time data characters and control characters are retrieved from the memory 6. As each 8 bit character is accessed, address register 22 is decremented. If the character is a display character, a character counter 26 is incremented. This keeps track of the remaining number of characters to be accessed from the memory 6 of a line to be displayed. However, if the character is a control character, the address register 22 is incremented but not the character counter 26. Eight bit characters continue to be accessed from memory 6 until 80 display characters have been accessed. Since control characters don't count in this accumulation the number of control characters is variable.

The problem of decoding the novel encoded instruction set shown in FIG. 8 is neatly resolved with a priority encoder and decoder. Referring to FIG. 3, the data in registers 42 and 44 go into a priority encoder 46, which may be a Texas Instruments type 74147 integrated circuit, or the like. Encoder 46 has the characteristic that a 3 bit number 47 which comes out represents the highest bit position input which has a zero. The 3 bit number 47 goes into a decoder 48 which may be a Texas Instruments type LS 138, or the like. The result is that one pin of the decoder 48 goes low depending upon which type of character is fetched from memory. Thus if the character fetched is an End of Line function, the number 5 output of the decoder 48 would goes low. If the data is an ASCII character, the number 7 output goes low.

Figure 4:
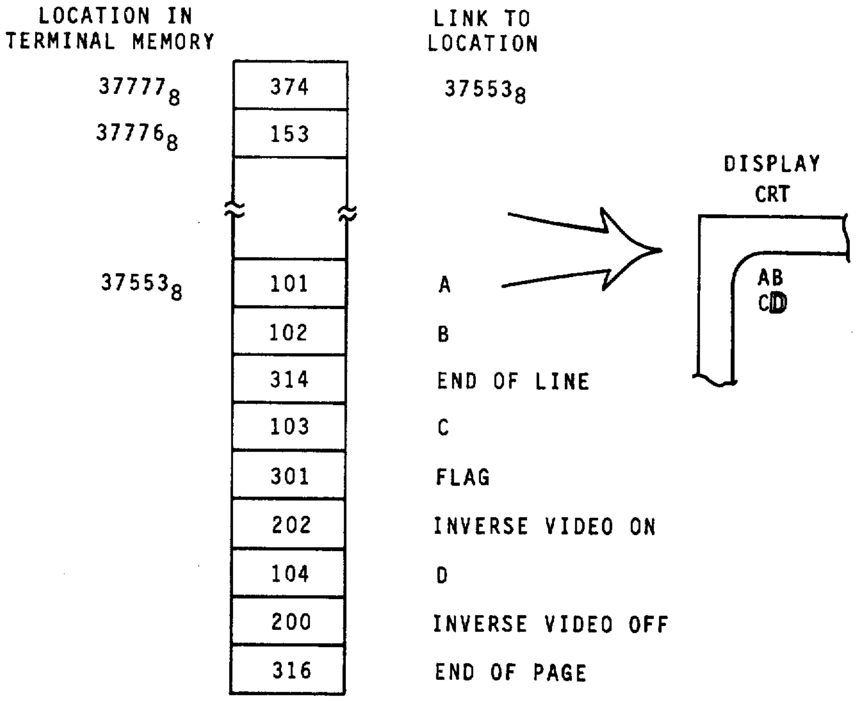
FIG. 4 illustrates a manner of storing data in a terminal memory in a linked list for use with the embodiment of FIG. 3.

Referring to FIG. 4, data is usually stored in terminal memory 6 in a LINKED LIST. A link may be, for example, a 2 character control sequence as shown in FIG. 4, which is interpreted by the data control 8 to change the terminal memory address of the next character to be fetched. The links allow the terminal memory 6 to be organized and used in a uniquely efficient manner and allow the tying together of data representing displayable lines of a CRT scan into displayable pages.

Figure 5:
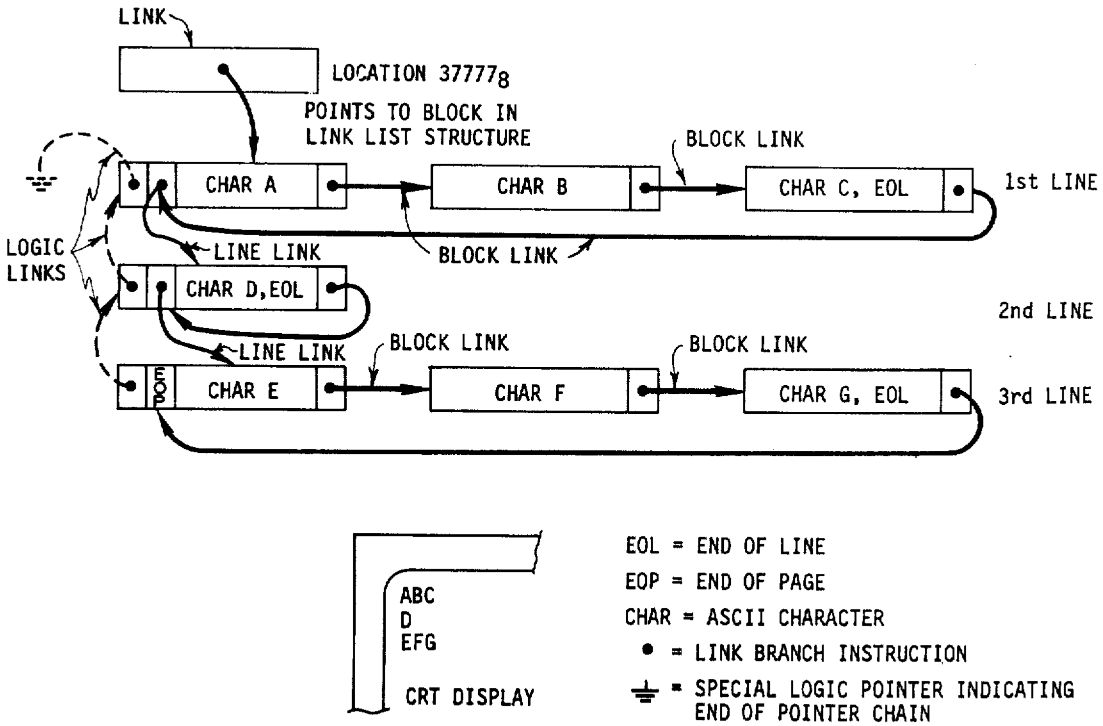
FIG. 5 illustrates the interrelationship between data blocks, links, and a visual display per scanned line on a cathode ray tube display.
Figure 1:
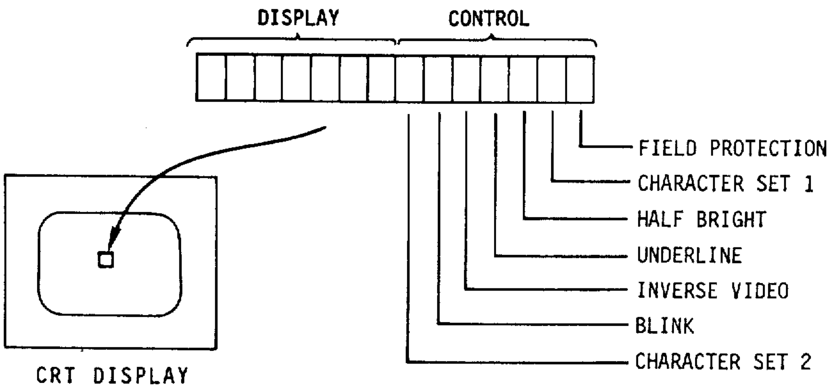
FIG. 1 illustrates an encoding method heretofore known in the art utilizing parallel definition of display parameters wherein extra bits of display storage are required whether an enhancement feature is used or not.
Figure 2A:
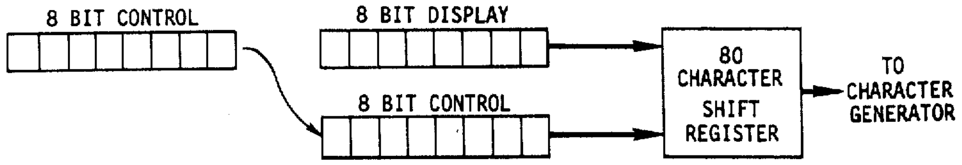
FIGS. 2A and 2B illustrate a novel encoding method wherein data representing figures to be displayed on a CRT and control functions are configured as 8 bit data and control characters.
Figure 2B:
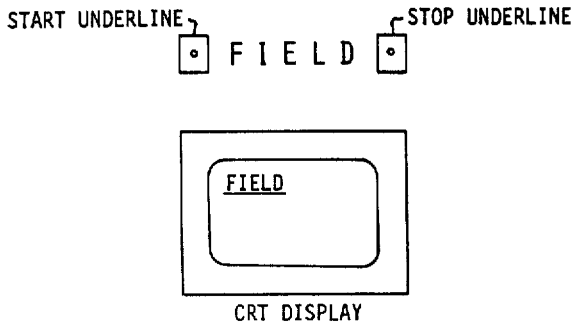

Referring to FIG. 5, the first two locations fetched, $37777_8$ and $37776_8$ are a link to the first 16 character block of information stored in terminal memory 6. In this first block of a line are links to the next block of that line and a link to the first block of the previous line and the next line.

Referring to FIG. 3, as the electron beam of the display CRT is being scanned through the 24th character row on the screen, Timing and Control Circuitry 20 sends a short vertical sync pulse 4 to address register 22. This resets the address register 22 to $37777_8$ and resets an END OF PAGE flip-flop 24 within the Data Control 8.

At the same time, the Interrupt Set signal 2 clears the character counter 26 to 0.

The output of the character counter 26 is detected by the Data Control 8 as not being equal to 80. If a DMA on flip-flop 28 is set, then flip-flop 28 goes high and a bus cycle is started.

Figure 6:
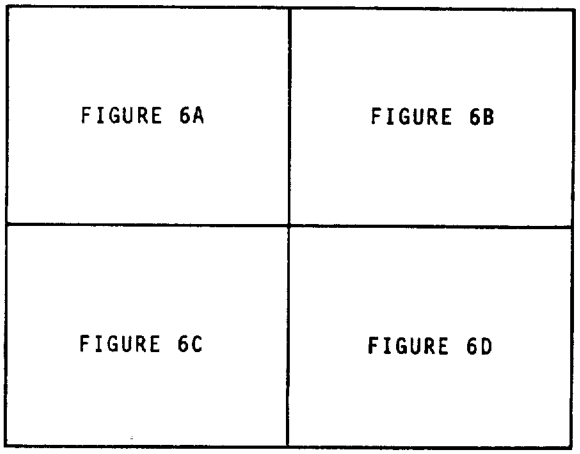
FIG. 6 is a detailed schematic diagram showing commercially available hardware for implementation of the preferred embodiment of FIG. 3.
Figure 6A:
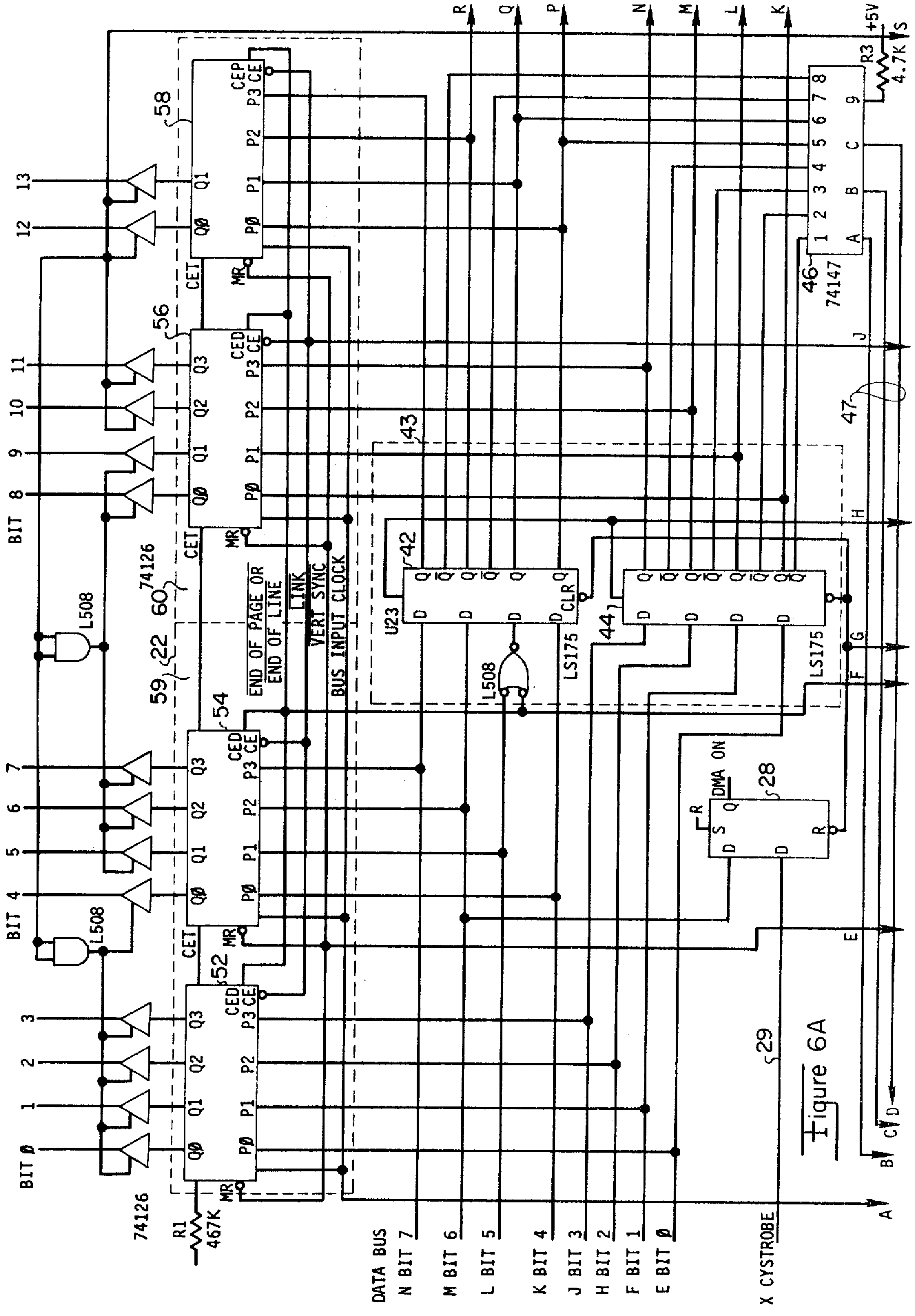
Figure 6B:
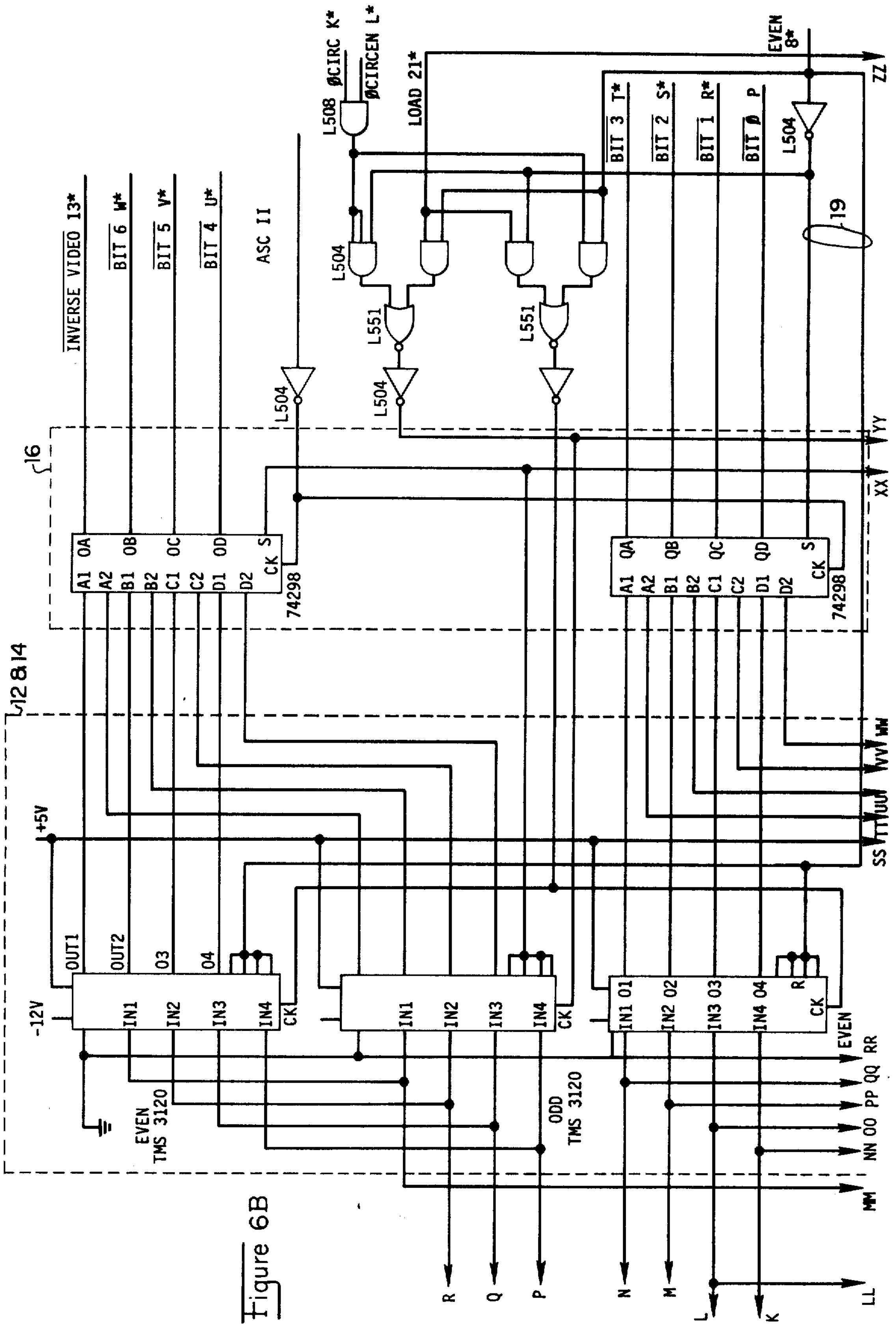
Figure 6C:
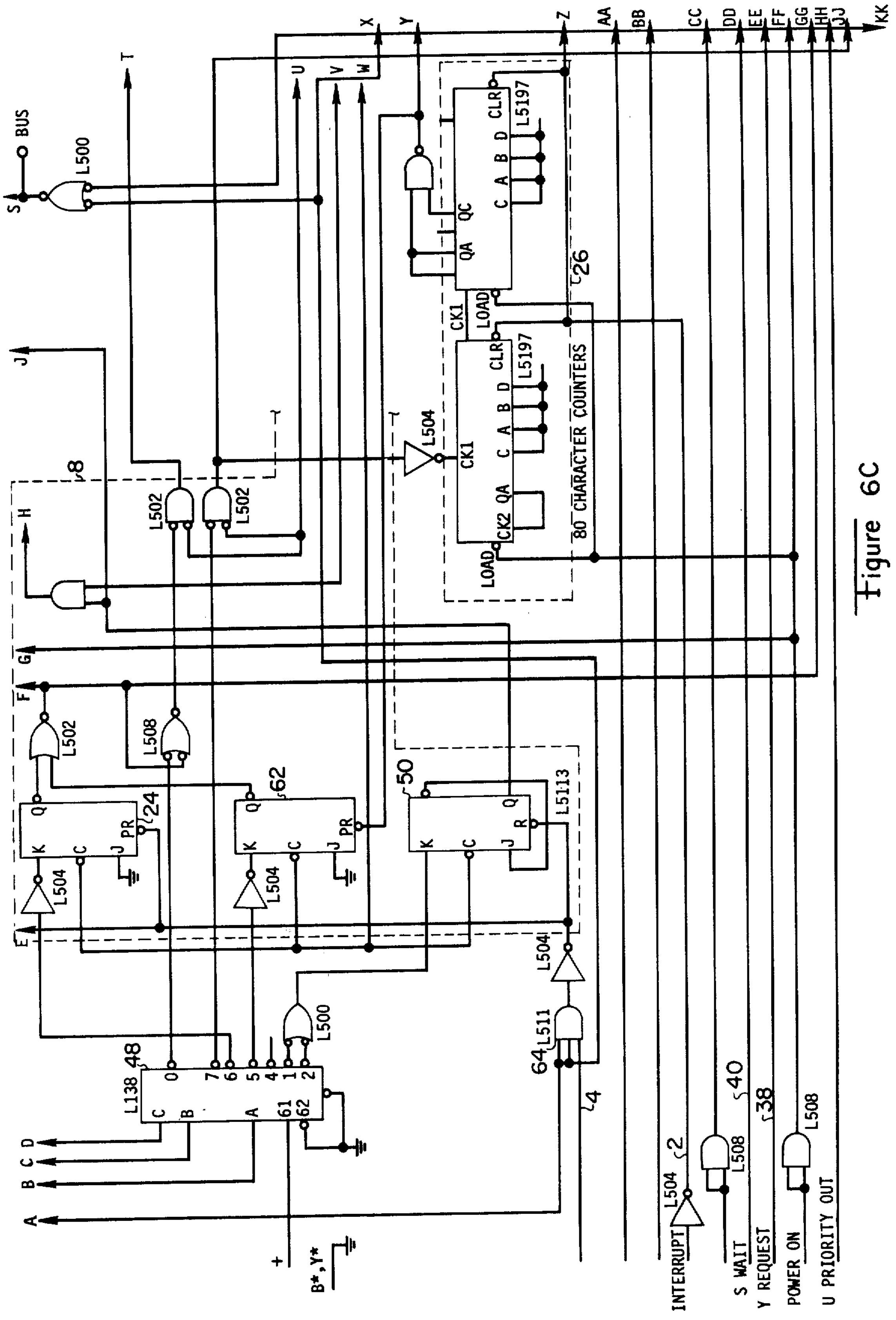
Figure 6D:
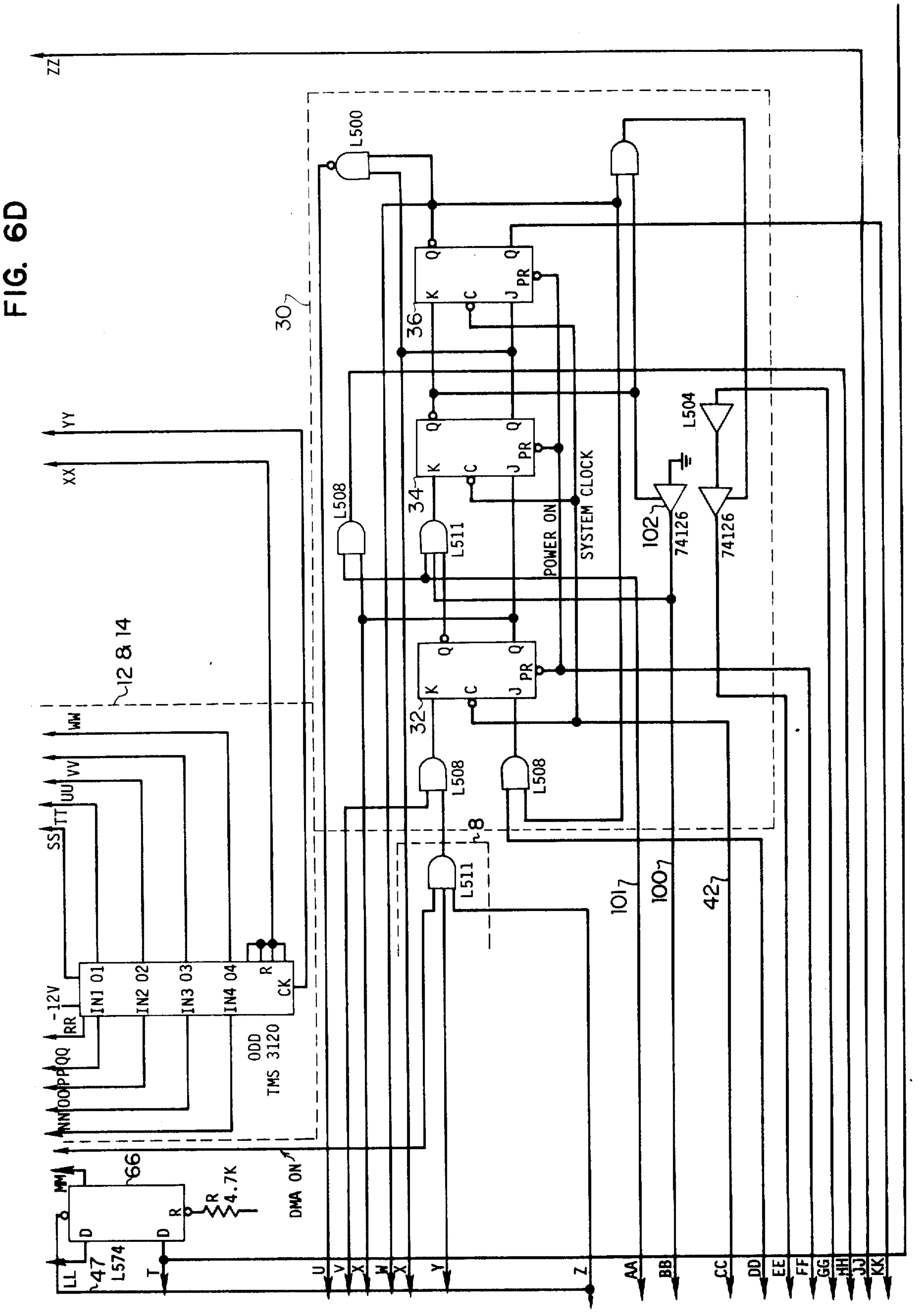

With a dynamically allocated display structure to which there is simultaneous access by more than one process, a lockout procedure is required. The shape of the structure must be changeable without destroying the continuity of other processes' access. With the linked list memory structure employed, the Data Control 8 picks up characters from the terminal memory at regular intervals. A processor may, for example, be changing the structure by inserting and deleting lines. If the processor, for example, would start to change a link character and the data control 8 would try to use the link it would find one new link character and one old one. This would errantly point the data control 8 off into memory casuing a flash on the screen. By turning the terminal bus control 30 off this flashing is minimized. Referring to FIG. 6, the processor turns the bus control 30 off before changing a link and turns it on again after the change by means of flip-flop 28. Flip-flop 28 is clocked by a strobe signal 29 from a processor.

Referring to FIG. 6, the terminal bus control 30 has 3 flip-flops, 32, 34 and 36. Referring to FIG. 7 the first flip-flop 32 is set when flip-flop 28 goes high and the flip-flops have a combined state of 000. When flip-flop 32 goes high, this is added with the two bus pins, BUSY 100, and PRIORITY IN 101. If these are both high, this indicates that the REFRESH control apparatus may take control of the bus. Referring again to FIG. 6, it does this by setting flip-flop 34. This sets the bus signal BUSY 100 low through a tri-state gate 102.

The bus cycle flip-flops are all clocked off the trailing edge of a bus clock signal 42. After flip-flop 34 goes high, the combined state 110 flip-flop 36 is set. This enables a REQUEST signal 38 on the bus. If the logic is executing an END OF PAGE or END OF LINE function, the request signal 38 is held off.

The terminal memory 6 decodes its address and starts a timer upon receiving REQUEST 38. It immediately sets a NOT WAIT signal 40 low to indicate that the REFRESH control apparatus should wait for the memory access time. When the memory's timer times out, it sets the WAIT line 49 high and the REFRESH apparatus proceeds to reset flip-flop 32. At this moment data is clocked off the data bus into the 4 bit registers, 42 and 44 of input register 43. If the function being executed were an END OF LINE or END OF PAGE, however, a 1 bit is inserted in bit 4 by priority encoder 40, which amounts to loading in of a "blank" character when interpreted by character generator 18.

The terminal bus control logic 30 resets flip-flops 34. This takes REQUEST 38 off the bus. The terminal memory 6 will discontinue output of data when it sees this.

Two hundred nanoseconds later, the address is taken off the terminal bus 10 as flip-flop 36 goes low. The terminal bus control 30 has now completed a six state sequence as shown in FIG. 7 and is ready to start over.

If the function decoded is a LINK, a link flip-flop 50 is set. On the next fetch from the terminal memory 6, the clocking in of data into the input holding registers 42 and 44 is disabled by the link flip-flop 50 and instead, data is loaded into the address register 22 (lower half) consisting of address registers 52 and 54. The data in the character buffer register 42 and 44 is loaded into the address register 22 (upper half) registers 56 and 58. Thus, a two character LINK operation has established a new terminal memory address in the address registers 59 and 60 comprising registers 52, 54, 56 and 58. To summarize, the LINk command character becomes the high order bits of the new address and the second character fetched becomes the lower order bits of the new address.

The LINK flip-flop 50 is reset upon clocking the two characters into the address registers 59 and 60, completing the link operation.

If the control character is an END OF LINE, an end of line flip-flop, 62 is set. Subsequent fetches from the terminal memory 6 are disabled by disabling the REQUEST signal 38. This causes dummy reads from memory. Since there is no request, no memory data is gated onto the terminal bus 10. The bus 10 remains at its quiescent state which is all zero. At the time data is clocked into the input holding register 43, the null input character is converted to a blank by character generator 18. Thus, it seems to the logic that blanks are being read from the memory 6. The address register 60 is inhibited from decrementing addresses so that the data control does dummy reads repeatedly from the same address. When all 80 characters have been input, the character counter 26 rolls over to 80. This holds off further data input. When the next interrupt set signal 2 from the Timing and Control Circuitry 20 resets the 80 character counter 26, the END OF LINE flip-flop 62 is also reset thereby returning the logic to the normal character input mode.

The End of Page operates identically to the END OF LINE except that the END OF PAGE flip-flop 24 is reset by a vertical sync flip-flop 64. Thus, after an END OF PAGE function is input from the terminal memory 6, blanks are delivered to the screen to the bottom of the screen display. At the end of the screen, the vertical sync signal 4 resets the END OF PAGE flip-flop 24 thereby returning the logic to its normal character mode.

Flags are functions disregarded by the REFRESH control apparatus. When a flag is fetched from the terminal memory 6 only the terminal address counter 60 is decremented and the REFRESH control goes on to fetch the next character from terminal memory 6.

Referring to FIG. 8 characters are those with a zero in bit 7 (the most significant bit) of the character. These are transferred to the 80 character circulating memory 12 and 14 from the input holding register 43. At the same time, the 80 character counter 26 is decremented.

Display enhancements select the character set and the enhancement modes of, for example inverse video, half-bright, underline and blinking. They have a zero in bit 6 and a 1 in bit 7 as shown in FIG. 8. The REFRESH control clocks inverse video into inverse video flip-flop 66 and sends this clocking signal on to a Display Option board 67. The Dispay Option board 67 clocks in the other 5 bits of a Control character. The output of the inverse video flip-flop 66 is entered into the 80 character shift registers 12 and 14 when the next character is entered. In the data stream, a Control character which changes the enhancements always precedes the data characters.

During the display of odd number lines on the cathode ray tube display screen, the REFRESH display circuitry is reading characters for the next even numbered row. There are 24 rows total. The even line 18 from the Timing and Control circuitry 20 indicates whether the display is on an even or odd line. This signal controls whether a rotating memory circulator clock signal 68 from the Timing Control 20 is to be sent to the even or odd 80 character shift registers 12 and 14. Thus during a display line on the screen, one set of the 80 character shift registers 12 and 14 is being loaded with new data from the terminal memory 6 while the other is being rapidly clocked by the circulation signal 68. Characters for refreshing the screen are selected and clocked into an internal 8 bit register 16. The data is then sent to the character generator 18.

I claim:

1. A display refresh method comprising the steps of:
- encoding data representing figures to be displayed as data characters;
- encoding data representing enhancement features and execution path instructions as control characters;
- combining the data and control characters to form linked list data blocks; and
- interpreting the linked list data blocks to form displayable lines.

2. A display refresh method as in claim 1 wherein the step of combining the data and control characters comprises the steps of:
- storing the encoded data in a fixed memory scheme in accordance with a logic instruction;
- accessing the stored data from the fixed memory in response to execution path instructions contained within the data control characters; and
- applying the accessed data to a holding register.

3. A display refresh method as in claim 1 wherein the step of encoding data representing figures to be displayed comprises the steps of:
- configuring information representing figures to be displayed in an 8 bit coding scheme wherein a most significant bit is a zero; and
- identifying a particular displayable figure by the 7 next significant bits.

4. A display refresh method as in claim 1 wherein the step of encoding data representing enhancement features and execution path instructions comprises the steps of:
- configuring information representing enhancement features and execution path changes in an 8 bit coding scheme wherein a most significant bit is a 1; and
- identifying a particular enhancement feature or control function by the remaining 7 bits.

5. A display refresh method as in claim 2 wherein the step of interpreting the linked list data blocks comprises the steps of:
- identifying data within a linked list data block representing a logic instruction address of a next data block to be accessed;
- accessing the identified data block;
- determining if the identified data block contains control characters or data characters;

applying a data character to character generation means;

identifying data within a control character as representing a change in an enhancement feature or an execution path instruction;

applying identified data representing a change in an enhancement feature to character generation means; and changing character interpretation in response to identified data representing an execution path instruction.

6. A control apparatus for refreshing a cathode ray tube display comprising:

a memory having data and control characters;

a holding register coupled to the memory to receive data and control characters;

data decoding means coupled to receive a control character representing a link operation from the holding register for producing a link signal;

control means coupled to receive the link signal from the data decoding means for altering the addressing of a next character to be fetched from the memory in response to the link signal; and a buffer coupled to receive data characters from the holding register.

7. A control apparatus for refreshing a cathode ray tube display as in claim 6 wherein the buffer comprises:

a first circulating memory connected to receive data characters and having data storage position equal to data necessary to display one line of displayable figures for producing data representing a displayable line of figures in response to a first applied signal;

a second circulating memory connected to receive data characters and having data storage positions equal to data necessary to display one line of displayable figures for producing data representing a displayable line of figures in response to a second applied signal;

timing and control means for applying a first signal to the first circulating memory in response to an odd line being displayed and for applying a second signal to the second circulating memory in response to an even line being displayed; and a selector register coupled to receive data from the first and second circulating memories for holding the stored data and producing the data in response to an applied timing signal.

8. A control apparatus as in claim 6 wherein data decoding means comprise:

encoding means coupled to receive a control character for producing a binary number representing the highest bit position of a selected logic level appearing in an applied control character input;

decoding means coupled to receive said binary number for producing a link signal in response to a control character representing a link operation being applied as an input to the encoding means.

9. A control apparatus as in claim 6 wherein control means comprise:

an address register;

logic means coupled to receive the link signal for changing an output from a first to a second logic state in response to receiving the link signal;

a data control responsive to the second logic state of the logic means for accessing a second character from the memory and loading the control character representing a link operation and the second character into the address register; and means coupled to the logic means for changing its output from the second logic state to the first logic state in response to the control character representing a link operation and said second character being loaded into the address register.

10. A control apparatus as in claim 8 wherein the selected logic level is a logic zero.

11. A control apparatus for refreshing a cathode ray tube display comprising:

a memory having data and control characters;

a holding register coupled to the memory to receive data and control characters;

data decoding means coupled to receive a control character representing the end of a line of data figures to be displayed from the holding register for producing an end of line signal;

logic means coupled to receive the end of line signal from the data decoding means for inhibiting the fetching of characters from the memory and loading a selected data character onto the holding register in response to the end of line signal; and a buffer coupled to receive data characters from the holding register.

12. A control apparatus as in claim 11 wherein data decoding means comprise:

encoding means coupled to receive a control character for producing a binary number representing the highest bit position of a selected logic level appearing in an applied control character input;

decoding means coupled to receive said binary number for producing an end of line signal in response to a control character representing an end of line operation being applied as an input to the encoding means.

13. A control apparatus for refreshing a cathode ray tube display as in claim 11 wherein the selected data character represents a displayable blank.

14. A control apparatus for refreshing a cathode ray tube display as in claim 11 wherein the buffer comprises:

a first circulating memory connected to receive data characters and having data storage positions equal to data necessary to display one line of displayable figures for producing data representing a displayable line of figures in response to a first applied signal;

a second circulating memory connected to receive data characters and having data storage positions equal to data necessary to display one line of displayable figures for producing data representing a displayable line of figures in response to a second applied signal;

timing and control means for applying a first signal to the first circulating memory in response to an odd line being displayed and for applying a second signal to the second circulating memory in response to an even line being displayed; and a selector register coupled to receive the data from the first and second circulating memories for holding the data and producing the data in response to an applied timing signal.

15. A control apparatus for refreshing a cathode ray tube display comprising:

a memory having data and control characters;

a holding register coupled to the memory to receive data and control characters;

data decoding means coupled to receive a control character representing the end of a displayable page from the holding register for producing an end of page signal;

control means coupled to receive the end of page signal from the data decoding means for altering the address of a next character to be fetched from memory in response to the end of page signal; and a buffer coupled to receive data characters from the holding register.

16. A control apparatus as in claim 15 wherein data decoding means comprise:

encoding means coupled to receive a control character for producing a binary number representing the highest bit position of a selected logic level appearing in an applied control character input;

decoding means coupled to receive said binary number for producing an end of page signal in response to a control character representing an end of page operation being applied as an input to the encoding means.

17. A control apparatus for refreshing a cathode ray tube display as in claim 15 wherein the selected data character represents a displayable blank.

18. A control apparatus for refreshing a cathode ray tube display as in claim 15 wherein the buffer comprises:

a first circulating memory connected to receive data characters and having data storage positions equal to data necessary to display one line of displayable figures for producing data representing a displayable line of figures in response to a second applied signal;

a second circulating memory connected to receive data characters and having data storage positions equal to data necessary to display one line of displayable figures for producing data representing a displayable line of figures in response to a second applied signal;

timing and control means for applying a first signal to the first circulating memory in response to an odd line being displayed and for applying a second signal to the second circulating memory in response to an even line being displayed; and a selector register coupled to receive the data from the first and second circulating memories for holding the data and producing the data in response to an applied timing signal.

19. A control apparatus for refreshing a cathode ray tube display comprising:

a memory having data and control characters;

a holding register coupled to the memory to receive data and control characters;

data decoding means coupled to receive a control character representing an inverse video enhancement for producing an inverse video signal;

logic means coupled to receive the inverse video signal from the data decoding means for loading a selected bit onto the holding register in response to the inverse video signal; and a buffer coupled to receive data characters from the holding register.

20. A control apparatus as in claim 19 wherein the buffer comprises:

a first circulating memory connected to receive data characters and having data storage positions equal to data necessary to display one line of displayable figures for producing data representing a displayable line of figures in response to a first applied signal;

a second circulating memory connected to receive data characters and having data storage positions equal to data necessary to display one line of displayable figures for producing a data representing a displayable line of figures in response to a second applied singal;

timing and control means for applying a first signal to the first circulating memory in response to an odd line being displayed and for applying a second signal to the second circulating memory in response to an even line being displayed; and a selector register coupled to receive the data from the first and second circulating memories for holding the data and producing the data in response to an applied timing signal.

21. A control apparatus for refreshing a cathode ray tube display comprising:

a memory having data and control characters;

a holding register coupled to the memory to receive data and control characters;

data decoding means coupled to receive a control character representing a desired logic path execution change instruction for producing a control signal;

control means coupled to receive the control signal from the data decoding means for altering logic path execution in response to the control signal; and a buffer coupled to receive data characters from the holding register.

22. A control apparatus as in claim 21 wherein data decoding means comprise:

encoding means coupled to receive a control character for producing a signal representing the highest bit position of a selected logic level appearing in an applied control character input; and decoding means coupled to receive the signal for producing a control signal in response to said signal.

23. A control apparatus as in claim 21 wherein the buffer comprises:

a first circulating memory connected to receive data characters and having data storage positions equal to data necessary to display one line of displayable figures for producing data representing a displayable line of figures in response to a first applied signal;

a second circulating memory connected to receive data characters and having data storage positions equal to data necessary to display one line of displayable figures for producing a data representing a displayable line of figures in response to a second applied signal;

timing and control means for applying a first signal to the first circulating memory in response to an odd line being displayed and for applying a second signal to the second circulating memory in response to an even line being displayed; and a selector register coupled to receive the data from the first and second circulating memories for holding the data and producing the data in response to an applied timing signal.

24. A control apparatus as in claim 21 including lock-out means coupled to the means for connecting to a memory for disabling acquisition of data from the memory during alteration of logic path execution in response to the data decoding means receiving a control character representing a desired logic path execution change instruction.

* * * * *

UNITED STATES PATENT AND TRADEMARK OFFICE

CERTIFICATE OF CORRECTION

PATENT NO. : 3,972,026

DATED : July 27, 1976

INVENTOR(S) : Waitman, et al

It is certified that error appears in the above-identified patent and that said Letters Patent are hereby corrected as shown below:

Column 2, line 29, "characters" should read -- character --; line 60, after "FIG. 4," delete -- in --;

Column 3, line 52, delete "would";

Column 4, line 20, after "memory" insert -- 6 --; line 27, "casuing" should be -- causing --; line 38, "added" should read -- anded --; line 46, after "110" insert -- , shown in Fig. 7, --; line 52, delete "NOT"; line 55, "49" should read -- 40 --; line 60, "40" should read -- 46 --;

Column 5, line 9, after "register" insert -- 43, comprising registers --; line 46, after "screen" insert -- display --;

Column 7, Claim 7, line 29, "position" should read -- positions --;

Column 10, Claim 20, line 4, before"data" delete -- a --; line 6, "singal" should read -- signal --; line 50, before "data" delete -- a --;

UNITED STATES PATENT AND TRADEMARK OFFICE

CERTIFICATE OF CORRECTION

PATENT NO. : 3,972,026

DATED : July 27, 1976

INVENTOR(S) : Waitman, et al

It is certified that error appears in the above-identified patent and that said Letters Patent are hereby corrected as shown below:

Column 10, Claim 24, lines 63 and 64, the phrase "means for connecting to a" should be deleted.

Signed and Sealed this

Twenty-fifth Day of January 1977

[SEAL]

*Attest:*

RUTH C. MASON
*Attesting Officer*

C. MARSHALL DANN
*Commissioner of Patents and Trademarks*